US012597993B2

(12) United States Patent
Dreiling et al.

(10) Patent No.: US 12,597,993 B2
(45) Date of Patent: Apr. 7, 2026

(54) DEVICE SETTINGS FOR SATELLITE NETWORKS

(71) Applicant: T-Mobile USA, Inc., Bellevue, WA (US)

(72) Inventors: Ryan P. Dreiling, Shawnee, KS (US); Derrick L. Ives, North Bend, WA (US); Thomas P. Lucht, Seattle, WA (US); Mehul Shah, Bellevue, WA (US); Helen Wang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 338 days.

(21) Appl. No.: 18/489,735

(22) Filed: Oct. 18, 2023

(65) Prior Publication Data

US 2025/0132811 A1 Apr. 24, 2025

(51) Int. Cl.
| | |
|---|---|
| *H04B 7/185* | (2006.01) |
| *H04W 8/22* | (2009.01) |
| *H04W 84/04* | (2009.01) |

(52) U.S. Cl.
CPC .......... *H04B 7/18513* (2013.01); *H04W 8/22* (2013.01); *H04W 84/042* (2013.01)

(58) Field of Classification Search
CPC .. H04B 7/18513; H04W 8/22; H04W 84/042; H04W 84/06
USPC ........................................................ 455/427
See application file for complete search history.

(56) References Cited

U.S. PATENT DOCUMENTS

| | | | |
|---|---|---|---|
| 11,082,973 B2 | 8/2021 | Wang et al. | |
| 11,171,719 B2 | 11/2021 | Cui et al. | |
| 12,335,795 B2 * | 6/2025 | Park ................. | H04W 36/0058 |
| 2010/0202408 A1 | 8/2010 | Lee | |
| 2021/0068013 A1 * | 3/2021 | Cheng ................. | H04W 48/18 |
| 2021/0194571 A1 * | 6/2021 | Ma ..................... | H04B 7/18504 |
| 2021/0242935 A1 | 8/2021 | Sakhnini et al. | |
| 2021/0359752 A1 | 11/2021 | Wang et al. | |
| 2021/0367661 A1 | 11/2021 | Ravishankar et al. | |
| 2021/0385675 A1 * | 12/2021 | Määttänen ........... | H04B 7/1851 |
| 2021/0410052 A1 | 12/2021 | Hebron et al. | |
| 2022/0007323 A1 | 1/2022 | Li et al. | |

(Continued)

FOREIGN PATENT DOCUMENTS

| | | | | |
|---|---|---|---|---|
| CN | 115066005 A | 9/2022 | | |
| WO | WO-2022216757 A1 * | 10/2022 | ........... | H04L 5/0048 |

(Continued)

OTHER PUBLICATIONS

International Search Report and Written Opinion for PCT/US2024/051840 dated Feb. 5, 2015, 11 pages.

*Primary Examiner* — Mahendra R Patel
(74) *Attorney, Agent, or Firm* — Perkins Coie LLP

(57) ABSTRACT

The present technology relates to device settings for satellite networks. A wireless device is disclosed that receives network information from a non-terrestrial network. The wireless device can access device configuration data that associates entries of network information with different device settings to determine, based on the network information, that the wireless device is to comply with particular device settings when connected with the non-terrestrial network. In doing so, the wireless device can be configured in accordance with the particular device settings when connected with the non-terrestrial network.

14 Claims, 4 Drawing Sheets

(56)          References Cited

U.S. PATENT DOCUMENTS

| | | | |
|---|---|---|---|
| 2022/0030511 A1 | 1/2022 | Wang et al. | |
| 2022/0039033 A1 | 2/2022 | Sengupta et al. | |
| 2022/0109496 A1 * | 4/2022 | Shrestha | H04B 7/18519 |
| 2022/0191868 A1 | 6/2022 | Zhou et al. | |
| 2022/0232463 A1 * | 7/2022 | Sadique | H04W 48/18 |
| 2022/0232464 A1 * | 7/2022 | Matolia | H04B 7/18554 |
| 2022/0240283 A1 * | 7/2022 | Hong | H04L 1/1896 |
| 2023/0262450 A1 * | 8/2023 | Kang | H04W 8/183 |
| | | | 455/419 |
| 2024/0314549 A1 * | 9/2024 | Mayalil | H04W 8/265 |
| 2025/0158701 A1 * | 5/2025 | Klenner | H04W 48/08 |
| 2025/0211326 A1 * | 6/2025 | Atungsiri | H04B 7/18545 |
| 2025/0287461 A1 * | 9/2025 | Rune | H04W 36/0061 |

FOREIGN PATENT DOCUMENTS

| | | | | |
|---|---|---|---|---|
| WO | WO-2022243910 A1 * | 11/2022 | | H04W 56/0045 |
| WO | WO-2023009916 A1 * | 2/2023 | | H04W 72/23 |
| WO | WO-2023034500 A1 * | 3/2023 | | G01S 5/0278 |

* cited by examiner

*FIG. 1*

*FIG. 2*

300

| Mobile Country Code (MCC) 302 | Mobile Network Code (MNC) 304 | Network Type 306 | Device Settings 308 |
|---|---|---|---|
| Germany (262) | T-Mobile (01) | Terrestrial Network (LTE) | Message/Voice Call: Enabled<br>Data Services: Enabled<br>Characteristic: LTE Icon |
| United States (310) | T-Mobile (660) | Terrestrial Network (5G) | Message/Voice Call: Enabled<br>Data Services: Enabled<br>Characteristic: 5G Icon |
| United States (312) | T-Mobile (190) | Non-Terrestrial Network | Message/Voice Call: Message only<br>Data Services: Disabled<br>Characteristic: Satellite Icon |
| International Networks (901) | Satellite Wireless (35) | Non-Terrestrial Network | Message/Voice Call: Enabled<br>Data Services: Disabled<br>Characteristic: Satellite Sound |

*FIG. 3*

DEVICE SETTINGS FOR SATELLITE NETWORKS

BACKGROUND

Current wireless communications systems (e.g., fifth-generation mobile network (5G)) utilize base stations to communicate with a user equipment. Base stations can be located at the surface of the Earth and support telecommunications coverage in a surrounding area. When in a coverage region of the base station, the user equipment can connect with the base station to communicate data through the network. Currently, the sixth-generation mobile system standard (6G) is under development. In contrast to 5G, 6G enables the user equipment to communicate directly with an orbiting satellite. The user equipment can connect to the satellite when within a coverage region of the satellite. In general, a satellite can provide a larger coverage region and can more easily provide coverage to remote locations. Accordingly, network providers are utilizing non-terrestrial networks to increase coverage and provide improved networks.

BRIEF DESCRIPTION OF THE DRAWINGS

Detailed descriptions of implementations of the present invention will be described and explained through the use of the accompanying drawings.

FIG. 1 illustrates a wireless communications system that can implement aspects of the present technology.

FIG. 2 illustrates a method for configuring device settings when connected with a satellite network in accordance with aspects of the present technology.

FIG. 3 illustrates device configuration data in accordance with aspects of the present technology.

Figure 4:
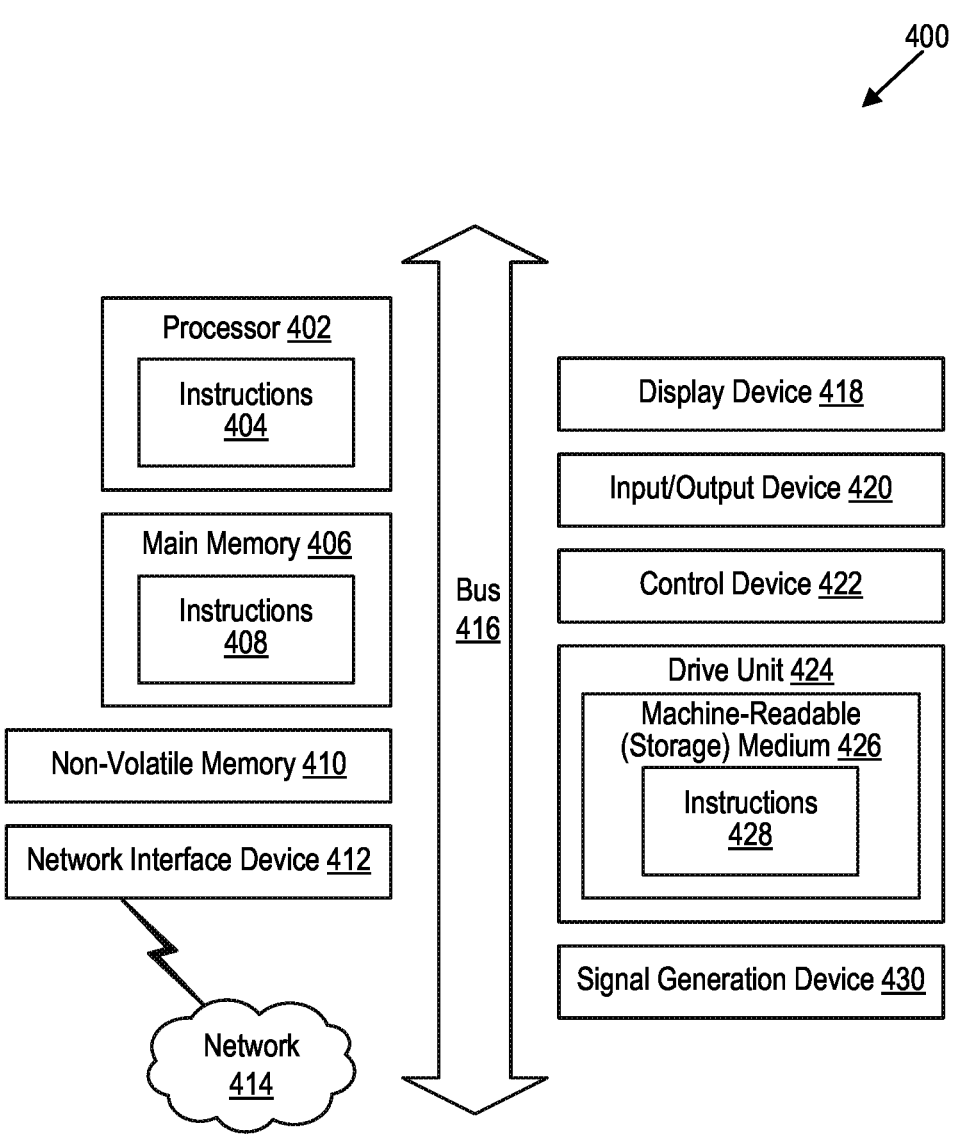
FIG. 4 illustrates components of a computing device that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

New generations of wireless communication, such as 6G, utilize satellites to improve network coverage. Given that satellites are not bound to the surface of the Earth, satellites can provide a larger coverage region than base stations and more easily provide coverage in remote locations. As a consequence of this increased coverage region, a greater number of users may compete for communication resources provided by the satellite networks, thereby increasing congestion. This congestion can be worsened by the limited wireless resources that are provided by these networks. For example, satellite networks can be difficult or costly to implement, resulting in these networks having decreased bandwidths or greater latency. Thus, satellite networks can be resource-constrained due to increased competition for limited communication resources.

Given that satellite networks and terrestrial networks have different capabilities, different device settings can enable wireless devices to function more efficiently on different networks. For example, satellite networks can be more resource-constrained than terrestrial networks implemented through surface-bound base stations and thus, mobile network providers can choose to disable some wireless services on satellite networks. For example, mobile network providers may choose to disable message, voice call, or data services on satellite networks. To reduce congestion caused by wireless devices transmitting service requests for wireless services that are not provided by a satellite network, mobile network providers can disable the wireless device from requesting these services when connected to a satellite network. Moreover, given the difference in capabilities of the network, a user of the wireless device can benefit from being informed that they have connected to a wireless network. To accomplish this, the mobile network provider can cause the wireless device to provide an indication of a connection to a satellite network when connected with a satellite network. The indication of the connection to the satellite network can be provided through visual, auditory, or haptic feedback.

The mobile network providers can disable the wireless device from requesting one or more wireless services and cause the wireless device to provide the indication of the connection to the satellite network by dictating device settings with which the wireless device is to comply when connected with a particular network. For example, the wireless device can maintain device configuration data that can be used to determine device settings associated with different networks. The device configuration data can associate different device settings with different entries of network information indicative of the different networks.

The device settings can be determined using information that is broadcast by available networks that have a coverage area that encompasses the location of a wireless device. For example, networks can broadcast an associated public land mobile network (PLMN) code, including a Mobile Country Code (MCC) and Mobile Network Code (MNC), within system information blocks. The wireless device can receive the system information blocks and determine if the wireless device is to comply with certain device settings when connected to a network associated with the PLMN code. In some cases, the wireless device is to comply with certain device settings only when the network is of a particular type. For example, the wireless device can determine the appropriate device settings associated with a network only when the network is determined to be a satellite network.

Alternatively or additionally, the wireless device is to comply with certain device settings only when the network is associated with a particular network provider. For example, a network provider can provide device settings for different networks associated with the particular network provider. As a specific example, a satellite network partnered with a terrestrial network provider can be allocated a PLMN code belonging to the terrestrial network provider rather than provisioning an entirely new PLMN code to the satellite network. As discussed above, satellite networks can have different capabilities than terrestrial networks. Thus, the terrestrial network provider can benefit from specifying different device settings associated with different networks having PLMN codes belonging to the terrestrial network provider. Given that the device settings are associated with networks having PLMN codes belonging to the terrestrial network provider, in some cases, the device settings can be determined in response to the determination that a wireless device is to connect with a mobile network having a PLMN code belonging to the terrestrial network provider.

In general, the device configuration data can be used to configure a wireless device to comply with particular device settings when connected with a network with which the particular device settings are associated. In doing so, the wireless device can be configured in accordance with device settings that allow the wireless device to communicate with a particular network with improved performance. The ability to configure the wireless device in accordance with specific device settings tuned to improve performance on a specific network can be particularly beneficial for satellite networks, which can have constrained network resources and greater restrictions.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

Figure 1:
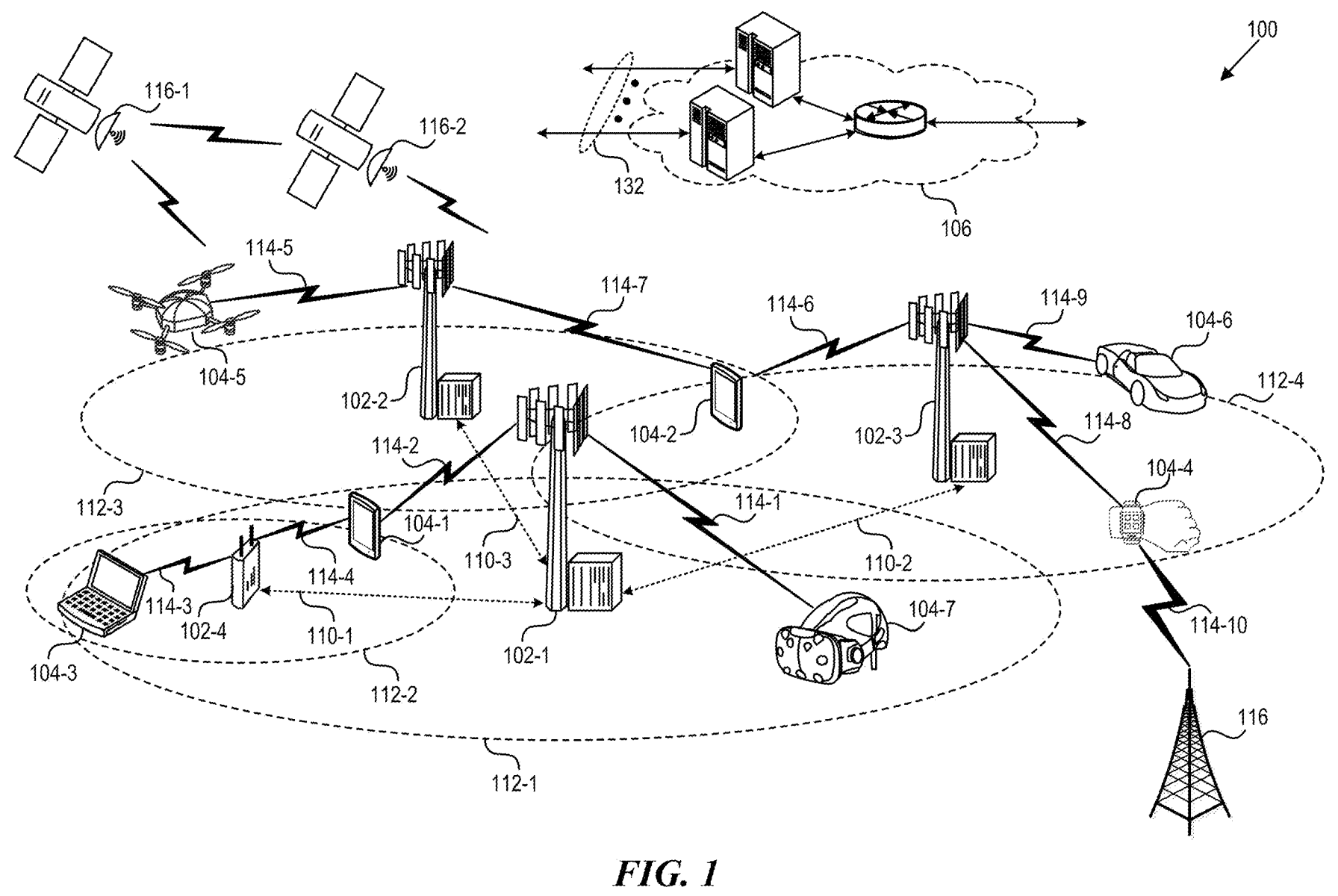

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/ LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a non-terrestrial network (NTN) is enabled by one or more satellites, such as satellites 116-1 and 116-2, to deliver services anywhere and anytime and provide coverage in areas that are unreachable by any conventional terrestrial network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Configuring a Device for Connection to a Satellite Network

FIG. 2 illustrates a method for configuring device settings when connecting with a satellite network in accordance with aspects of the present technology. Although illustrated in a particular configuration, one or more operations of the method 200 may be omitted, repeated, or reorganized. Additionally, the method 200 may include other operations not illustrated in FIG. 2—for example, operations detailed in one or more other methods described herein.

As illustrated, a wireless device 202 (e.g., an example of the wireless device 104 of FIG. 1) can be capable of communicating with different network types. For example, the wireless device 202 can connect with terrestrial networks (e.g., a 3G, LTE, 4G, 5G, or other terrestrial network) or non-terrestrial networks. Terrestrial networks can be implemented through any number of base stations located at the surface of the Earth. The terrestrial network can include a home terrestrial network, one or more partnered terrestrial networks, and one or more non-partnered terrestrial networks. The home terrestrial network can have an MCC and MNC that are the same as the MCC and MNC indicated within an international mobile subscriber identity (IMSI) of the wireless device 202. The partnered terrestrial networks can have a partnership agreement with the home mobile network to provide roaming services to the wireless device 202 within a coverage area of the partnered terrestrial networks. The non-partnered terrestrial networks may not have a partnership agreement in place with the home terrestrial network but may still provide some limited services to the wireless device 202, such as emergency services, within a coverage region of the non-partnered terrestrial networks.

In contrast, satellite networks (or non-terrestrial networks) can be implemented through at least one satellite orbiting the Earth. As illustrated in FIG. 2, the wireless device 202 communicates with at least one satellite network 204. In aspects, the satellite network 204 includes a satellite network provided by a same mobile network provider as the home terrestrial network or having a partnership agreement with the home terrestrial network. Thus, the satellite network 204 can provide wireless communication services to the wireless device 202 within a coverage region of the satellite network 204. In aspects, non-partnered satellite networks can provide only limited services to the wireless device 202. As a result, non-partnered satellite networks can be treated similarly to non-partnered terrestrial networks in that the wireless device 202 generally will not attempt to connect with non-partnered networks when requesting non-emergency services.

The wireless device 202 includes communication logic 206 capable of controlling the transmission of signaling to a communications network (e.g., the satellite network 204 or a terrestrial network) and the reception of signaling from the communication network using a wireless transceiver. The communication logic 206 can be implemented in hardware, software, or firmware. In aspects, the communication logic 206 can process the signals received at the wireless transceiver in accordance with a communication technology. For example, the communication logic 206 can analyze system information received from available networks to determine if a network is available to provide a wireless communication service to the wireless device 202. In response to determining that a network is available to provide the network, the communication logic 206 can request to connect to the available network such that the available network can provide a wireless service to the wireless device.

The communication logic 206 can provide network information (e.g., located within system information blocks broadcast by proximate networks) to a device settings application 208 responsible for configuring the device to have particular device settings with which the wireless device 202 is to comply when connected with the available network. The device settings application 208 can utilize information about the available network to determine particular device settings for the wireless device 202 when the wireless device 202 is connected to the available network. The device settings application 208 can retrieve the device settings from device configuration data. The device configuration data can store sets of device settings with which the wireless device 202 is to comply when connected to respective networks associated with respective entries of network information in the device configuration data. The device settings can provide the wireless device 202 permission to request one or more wireless services from a network, prevent the wireless device 202 from requesting one or more wireless services from the network, or adjust a visual, auditory, or haptic characteristic of the wireless device 202. In some cases, the device configuration data can be associated with a particular mobile network provider to differentiate between sets of device settings with which the wireless device is to comply when connected to the different networks provided by the mobile network provider. In some cases, the device configuration data can include device settings associated with different types of networks (e.g., non-terrestrial networks, terrestrial networks, generations of these networks, and so on) such that the device settings application 208 can use the device configuration data to determine the device settings with which the wireless device 202 is to comply when connected to a particular type of network. Further details of the device configuration data can be described with respect to FIG. 3.

At 210, the wireless device 202 can receive broadcast information related to and broadcasted by a proximate network (e.g., a network whose coverage area includes the location of the wireless device). As illustrated, the satellite network 204 transmits network information that is received by the wireless device 202. For example, the satellite network 204 can transmit a PLMN code allocated to the satellite network 204 within system information blocks broadcast by the satellite network 204. The network information related to the satellite network 204 can be broadcast repeatedly at predetermined intervals. The wireless device 202 can receive the network information from the satellite network 204 when within a coverage region of the satellite network 204. For example, the communication logic 206 can tune a receiver of the wireless device 202 to receive the network information from the satellite network 204. If the wireless device 202 is outside of the coverage region of the satellite network 204, the wireless device 202 may be unable to receive the network information.

The communication logic 206 can analyze the network information to select a network to which the wireless device 202 is to connect. The network information can be analyzed at least once every predetermined period of time to enable network selection/re-selection. As a specific example, network information can be analyzed at least once every six minutes to enable network selection/re-selection once every six minutes.

The communication logic 206 can compare the network information to one or more lists of approved networks to which the wireless device 202 is approved to connect. In aspects, the approved networks can include a home terrestrial network of the wireless device 202 and at least one partnered network partnered with the home network to allow the wireless device 202 to roam on the partnered network. In some cases, the partnered network can include a partnered satellite network, such as the satellite network 204. The information associated with one or more of the approved networks can be stored in a list of approved mobile networks. Thus, the network information can be compared to the PLMN code of the home network and one or more PLMN codes of partnered networks to determine if the network information is associated with one or more approved networks. If so, the wireless device 202 can determine that an approved network is available to the wireless device 202.

At 212, the wireless device 202 can initiate a wireless access request to an approved network that is available to provide the wireless communication service. The wireless access request can be initiated in response to determine that an approved network is available to provide the wireless communication service. The wireless access request can be initiated by performing at least a portion of a network selection/re-selection procedure. For example, network information received from the satellite network 204 can be used to determine the satellite network 204 as an approved network. As a result, the wireless device 202 can initiate the wireless access request to the satellite network 204 to request the satellite network 204 to provide the wireless communication service to the wireless device 202. In response, the wireless device 202 can connect to the satellite network 204 such that the satellite network 204 provides the wireless service (e.g., message, call, data, or other services) to the wireless device 202.

At 214, the communication logic 206 can provide an indication of the network information to the device settings application 208. In some cases, the communication logic 206 only provides the device settings application 208 the indication of the network information once it is determined that the wireless device 202 will attempt to connect to the network. For example, the network information can be indicated to the device settings application 208 once the satellite network 204 is determined as an approved network capable of providing the wireless service. In some cases, the indication of the network information can be provided to the device settings application 208 after transmission of the network connection request.

At 216, the device settings application 208 determines the type of network with which the wireless device 202 is to connect. The determination can be based on the indication of the network information. In some cases, the network information can include the PLMN code of the network and determine the network type based on the PLMN code. For example, the wireless device 202 can compare the PLMN code to data that associates different PLMN codes with different network types. In doing so, the wireless device 202 can determine that the satellite network 204 is a non-terrestrial network. In response to determining that the satellite network 204 is a non-terrestrial network, the device settings application 208 can determine appropriate device settings for the wireless device 202 when connected with the satellite network 204 at 220.

Alternatively or additionally, at 218, the device settings application 208 can determine a mobile network provider associated with the network information. As discussed above, the satellite network 204 can be partnered with a home network of the wireless device. In some cases, the PLMN code of the satellite network 204 can be allocated to the satellite network 204 by a network provider of the home network of the wireless device 202. For example, the network provider of the home network of the wireless device 202 can have multiple associated PLMN codes, and the network provider can allocate one or more of the PLMN codes to the satellite network 204. The device settings application 208 can compare the PLMN code of the satellite network 204 to data associating PLMN codes with different mobile network providers. In doing so, the device settings application 208 can determine that the network information is associated with the mobile network provider of the home network. After determining that the network information is associated with the mobile network provider, the device settings application 208 can compare the network information to device configuration data that associates entries of network information of networks associated with the mobile network provider to different network types or sets of device settings. In this way, the device settings application 208 can determine appropriate settings for the wireless device 202 when connected with the satellite network 204 at 220.

Although the determinations at 216 and 218 are illustrated and described as being performed at the device settings application 208, in other cases, the determination at 216 and 218 can be performed at the communication logic 206 or any other component and an indication of the determination can be provided to the device settings application 208.

At 220, the device settings application 208 determines one or more device settings associated with the network information. The device settings application 208 can determine the device settings by comparing the network information to a device configuration data. The device configuration data can be maintained on the SIM or on any other storage within or coupled with the wireless device 202. Alternatively, the device settings application 208 can receive the device configuration data from the satellite network or any other wireless network using a receiver of the wireless device 202 and the communication logic 206. In aspects, the device configuration data can include one or more entries of network information, respective network types of respective ones of the entries of network information, or respective device settings associated with the respective ones of the entries of network information. Thus, by comparing the network information to the device configuration data, device settings with which the wireless device 202 is to comply when connected with the satellite network 204 can be determined.

In some embodiments, the device settings are determined after the satellite network 204 is determined to have a particular type that may require particular device settings.

For example, the device settings application 208 can determine the device settings with which the wireless device 202 is to comply when connected with the satellite network 204 after determining that the satellite network 204 is a non-terrestrial network. In some cases, the device configuration data can associate a single set of device settings with a network type. In this way, the device settings can be determined by searching for the set of settings corresponding to the network type. In other cases, the device settings can be assigned on a per-network basis such that two different non-terrestrial networks can have different sets of device settings. Thus, the specific network information can be used to determine the appropriate set of device settings with which to comply when connected with the satellite network 204.

In some embodiments, the device settings are determined after the network information is determined to be associated with a particular provider. For example, the satellite network 204 can be allocated a PLMN code (e.g., the satellite network 204 broadcasts the PLMN code) that belongs to a first mobile network provider (e.g., is associated with the first mobile network provider in a PLMN code list) with which a second provider of the satellite network 204 is partnered. In aspects, the second provider of the satellite network 204 can have a partnership agreement with the first mobile network provider such that customers of the first mobile network provider can communicate on the satellite network 204. Given that the network information is associated with the first mobile network provider and allocated, by the first mobile network provider, to the satellite network 204, when the wireless device 202 analyzes the PLMN code of the satellite network 204, it can determine that the PLMN code belongs to the first mobile network provider. The first mobile network provider can allocate PLMN codes to different networks that operate better with different device settings. To accommodate the various sets of device settings associated with the different networks, the first mobile network provider can provide the wireless device 202 with device configuration data that includes various network information associated with respective device settings, and the wireless device 202 can reference the device configuration data once the network information is determined to be associated with the first mobile network provider.

At 222, the device settings application 208 can configure the wireless device 202 in accordance with the device settings determined at 220. Configuring the wireless device 202 in accordance with the device settings can be performed before or after connecting with the satellite network 204. In aspects, the wireless device 202 can be configured such that the wireless device 202 is unable to request one or more wireless services from the satellite network 204. For example, the wireless device 202 can be disabled from requesting voice call or data services from the satellite network 204 due to the reduced resources available on the satellite network. In doing so, not only can network resources be saved by not providing the wireless services, but also network resources can be saved by not having to communicate the connection requests for these services, which can be particularly beneficial in resource-constrained satellite networks. In some embodiments, the device settings can relate to a visual, auditory, or haptic characteristic of the wireless device 202. In this way, configuring the wireless device 202 to comply with the device settings can include adjusting a visual, auditory, or haptic characteristic of the wireless device 202. As specific examples, the wireless device 202 can display an icon indicative of a connection to the satellite network 204 on a display of the wireless device 202, output a sound indicative of a connection to the satellite network 204 using a speaker of the wireless device 202, or actuate a haptic element of the wireless device 202 to produce haptic feedback at the wireless device 202.

Although specific examples are provided, the method 200 can be performed to configure a wireless device 202 in accordance with different device settings. Moreover, the device settings application 208 can configure the wireless device 202 in response to different networks or different types of networks. Thus, from the foregoing, it is appreciated that the particular examples described with respect to FIG. 2 are but some of many possible examples.

FIG. 3 illustrates device configuration data 300 in accordance with aspects of the present technology. As discussed above, the device configuration data 300 can include one or more entries of network information and respective ones of one or more device settings associated with respective entries of network information. The device configuration data 300 can be stored in any number of data structures (e.g., a table, linked list, multi-dimensional matrix, or tree). In aspects, the entries of network information can include respective PLMN codes of the networks (e.g., broken out into MCCs 302 and MNCs 304) or respective network types 306 of the networks. The device settings 308 can indicate one or more wireless services that the wireless device is enabled to request or disabled from requesting. In aspects, the device settings 308 can include a visual, auditory, or haptic characteristic of the wireless device.

Although the device configuration data 300 includes specific examples of entries of network information and associated device settings, other examples are considered. For example, the device configuration data 300 can exclude the MCCs 302, the MNCs 304, or the network types 306. In some cases, networks of the network types can have the same settings. Thus, the different MCCs 302 and MNCs 304 can be redundant and can be absent from the device configuration data 300. In this way, the device settings 308 can be associated with the network types 306. Alternatively, the device settings 308 can be associated with specific MCCs 302 and MNCs 304. In this way, different networks of the same network type can be associated with different device settings.

In some embodiments, the device configuration data 300 can be associated with a particular network provider. For example, the entries in the device configuration data 300 can have MNCs 304 associated with T-Mobile. Thus, the device configuration data 300 can provide the device settings 308 for the various networks associated with the particular network provider. The device configuration data 300 can be provided by the particular network provider (e.g., through a SIM card, over a wireless network, or otherwise). Given that the device configuration data 300 includes only data relating to the particular network provider, in some cases, the device configuration data 300 is utilized to only determine the device settings 308 in response to determining that the network information is associated with the particular network provider.

The example device configuration data 300 illustrated in FIG. 3 includes four entries of network information. Specifically, a first entry of network information has an MCC of 262, which is associated with the country Germany, and an MNC of 01, which is associated with T-Mobile in Germany. The first entry of network information further includes a network type that identifies the network as a terrestrial Long-Term Evolution (LTE) network. Thus, the network associated with the first entry of network information can be an LTE terrestrial network operated by T-Mobile and located in Germany. Given that LTE terrestrial networks are often not resource-constrained, the device settings associated with the first entry of network information can allow the wireless device to request message, voice call, and data services. Moreover, the LTE wireless device can display an LTE icon to indicate that the wireless device is connected with an LTE network.

Similar to the first entry of network information, the second entry of network information indicates that the associated network is a terrestrial network. However, the network associated with the second entry of network information can be indicated as a 5G network. Moreover, the MCC, 310, of the second entry of network indication indicates that the associated network is located in the United States, and the MNC, 660, indicates that the associated network is operated by T-Mobile in the United States. Given that the network is a terrestrial network that is likely not resource-constrained, the device settings associated with the second entry of network information can have message, voice call, and data services enabled. Further, the device settings can specify that the wireless device is to display an icon associated with a connection to a 5G network.

The third entry of network information is associated with a non-terrestrial network. In aspects, the non-terrestrial network can be a non-terrestrial network partnered with T-Mobile to provide wireless communication services. To enable the non-terrestrial network to be identified by its PLMN code, T-Mobile can allocate a PLMN code associated with T-Mobile to the non-terrestrial network. For example, T-Mobile can provide wireless devices (e.g., subscribed to T-Mobile) with the device configuration data 300 that indicates that a network having an MCC of 312 associated with the United States and an MNC of 190 associated with T-Mobile is a non-terrestrial network. The device configuration data 300 can further define the device settings with which a wireless device is to comply when connected with the network associated with the third entry of network information. As illustrated, the device settings enable the wireless device to request message services from the non-terrestrial network but can disable the wireless device from requesting voice call and data services from the non-terrestrial network due to the increased resources required for these services and the decreased resources available on the non-terrestrial network. Similarly, the device settings can cause the wireless device to display an icon on the display of the wireless device that indicates that the wireless device is connected with the non-terrestrial network.

The fourth entry of network information is similarly associated with a non-terrestrial network. In aspects, the non-terrestrial network associated with the fourth entry of network information can be partnered with a network provider (e.g., T-Mobile) to provide a wireless communication service. In contrast to the third entry of network information, the fourth entry of network information can have a PLMN code associated with a generic international network instead of a particular country. Moreover, the PLMN code can be associated with the particular network provider that provides the non-terrestrial network instead of a network provider with which the non-terrestrial network is partnered. As illustrated, the MCC of the non-terrestrial network is 901, which is associated with international networks, and the MNC is 35, which is associated with the network provider "Satellite Wireless." To conserve resources on the non-terrestrial network, the device settings associated with the fourth entry of network information enable the wireless device to request message and voice call services but not data services. Moreover, the device settings can cause the wireless device to indicate that it is connected to the non-terrestrial network. As illustrated, the device settings associated with the fourth entry of network information cause the wireless device to output a sound that indicates that the wireless device is connected to the non-terrestrial network.

As illustrated, in some cases, the non-terrestrial networks can be indicated within the device configuration data 300 as having a PLMN code that belongs to and is allocated by a partnered network provider. In other cases, the non-terrestrial networks can have their own separate PLMN code. Moreover, the device configuration data 300 can specify device settings for each network type or for each network. Thus, in some embodiments, the individual network-specific information (e.g., MCC or MNC) or the network type can be omitted from the device configuration data.

In general, the device configuration data 300 can include other network information capable of being used to identify a network with which a wireless device can connect. Moreover, the device configuration data 300 can include other device settings. For example, the device configuration data 300 can include device settings that cause the wireless device to alter one or more characteristics of the wireless device, enable/disable one or more features on the wireless device, adjust one or more parameters defining communication between the wireless device and a mobile network, and so on.

Computing System

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computing system 400 can be an embedded computing system, a system-on-chip (SOC), a single-board computing system (SBC), or a distributed system such as a mesh of computing systems, or it can include one or more cloud components in one or more networks. Where appropriate, one or more computing systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or
synonyms does not exclude the use of other synonyms.
Special significance should not be placed upon whether or
not a term is elaborated or discussed herein. The use of
highlighting has no influence on the scope and meaning of
a term. Further, it will be appreciated that the same thing can
be said in more than one way.

Unless the context clearly requires otherwise, throughout
the description and the claims, the words "comprise," "com-
prising," and the like are to be construed in an inclusive
sense, as opposed to an exclusive or exhaustive sense—that
is to say, in the sense of "including, but not limited to." As
used herein, the terms "connected," "coupled," and any
variants thereof mean any connection or coupling, either
direct or indirect, between two or more elements; the coupling or connection between the elements can be physical,
logical, or a combination thereof. Additionally, the words
"herein," "above," "below," and words of similar import can
refer to this application as a whole and not to any particular
portions of this application. Where context permits, words in
the above Detailed Description using the singular or plural
number may also include the plural or singular number,
respectively. The word "or" in reference to a list of two or
more items covers all of the following interpretations of the
word: any of the items in the list, all of the items in the list,
and any combination of the items in the list. The term
"module" refers broadly to software components, firmware
components, and/or hardware components.

While specific examples of technology are described
above for illustrative purposes, various equivalent modifications are possible within the scope of the invention, as
those skilled in the relevant art will recognize. For example,
while processes or blocks are presented in a given order,
alternative implementations can perform routines having
steps, or employ systems having blocks, in a different order,
and some processes or blocks may be deleted, moved,
added, subdivided, combined, and/or modified to provide
alternative or sub-combinations. Each of these processes or
blocks can be implemented in a variety of different ways.
Also, while processes or blocks are at times shown as being
performed in series, these processes or blocks can instead be
performed or implemented in parallel or can be performed at
different times. Further, any specific numbers noted herein
are only examples such that alternative implementations can
employ differing values or ranges.

Details of the disclosed implementations can vary con-
siderably in specific implementations while still being
encompassed by the disclosed teachings. As noted above,
particular terminology used when describing features or
aspects of the invention should not be taken to imply that the
terminology is being redefined herein to be restricted to any
specific characteristics, features, or aspects of the invention
with which that terminology is associated. In general, the
terms used in the following claims should not be construed
to limit the invention to the specific examples disclosed
herein, unless the above Detailed Description explicitly
defines such terms. Accordingly, the actual scope of the
invention encompasses not only the disclosed examples but
also all equivalent ways of practicing or implementing the
invention under the claims. Some alternative implementations can include additional elements to those implementa-
tions described above or include fewer elements.

Any patents and applications and other references noted
above, and any that may be listed in accompanying filing
papers, are incorporated herein by reference in their entireties, except for any subject matter disclaimers or disavowals,
and except to the extent that the incorporated material is inconsistent with the express disclosure herein, in which
case the language in this disclosure controls. Aspects of the
invention can be modified to employ the systems, functions,
and concepts of the various references described above to
provide yet further implementations of the invention.

To reduce the number of claims, certain implementations
are presented below in certain claim forms, but the applicant
contemplates various aspects of an invention in other forms.
For example, aspects of a claim can be recited in a means-
plus-function form or in other forms, such as being embod-
ied in a computer-readable medium. A claim intended to be
interpreted as a means-plus-function claim will use the
words "means for." However, the use of the term "for" in
any other context is not intended to invoke a similar inter-
pretation. The applicant reserves the right to pursue such
additional claim forms either in this application or in a
continuing application.

We claim:
1. A wireless device comprising:
at least one hardware processor; and
at least one non-transitory memory storing instructions
that, when executed by the at least one hardware
processor, cause the wireless device to:
receive, from a non-terrestrial communication network
provided by a first mobile network provider, particu-
lar network information,
wherein the particular network information is asso-
ciated with a second mobile network provider
different from the first mobile network provider,
and
wherein the particular network information com-
prises a public land mobile network (PLMN) code
broadcast by the non-terrestrial communication
network;
in response to receiving the particular network infor-
mation, request to connect to the non-terrestrial
communication network such that a wireless com-
munication service is provided by the non-terrestrial
communication network;
in response to receiving the particular network infor-
mation, determine, based on the particular network
information, that the particular network information
is associated with the second mobile network pro-
vider;
in response to determining that the particular network
information is associated with the second mobile
network provider, determine, based on the particular
network information and device configuration data,
one or more particular device settings with which the
wireless device is to comply when connected with
the non-terrestrial communication network,
wherein the device configuration data includes one
or more entries of network information and
respective device settings associated with respec-
tive ones of the one or more entries of network
information; and
in response to requesting to connect to the non-terres-
trial communication network and determining the
one or more particular device settings, configure one
or more device settings of the wireless device to
comply with the one or more particular device set-
tings,
wherein configuring the one or more device settings
of the wireless device to comply with the one or
more particular device settings comprises dis- abling the wireless device from requesting for the non-terrestrial communication network to provide voice call services.

2. The wireless device of claim 1, wherein the device configuration data is associated with the second mobile network provider and the one or more entries of network information include one or more entries of network information associated with the second mobile network provider.

3. The wireless device of claim 1, wherein the instructions further cause the wireless device to receive, from the non-terrestrial communication network, a system information block, wherein the particular network information is included within the system information block.

4. The wireless device of claim 1, wherein configuring the one or more device settings in accordance with the one or more particular device settings comprises disabling the wireless device from requesting for the non-terrestrial communication network to provide data services.

5. The wireless device of claim 1, wherein the instructions further cause the wireless device to receive the device configuration data from the non-terrestrial communication network.

6. The wireless device of claim 1, wherein the device configuration data is stored on the wireless device.

7. A wireless device comprising:
at least one hardware processor; and
at least one non-transitory memory storing instructions that, when executed by the at least one hardware processor, cause the wireless device to:
receive, from a mobile communication network, particular network information allocated to the mobile communication network,
wherein the particular network information comprises a public land mobile network (PLMN) code broadcast by the mobile communication network;
in response to receiving the particular network information, request to connect to the mobile communication network such that a wireless communication service is provided by the mobile communication network;
in response to receiving the particular network information, determine, based on the particular network information, that the mobile communication network is a non-terrestrial network;
in response to determining that the mobile communication network is a non-terrestrial network, determine, based on device configuration data, one or more particular device settings with which the wireless device is to comply when connected with the mobile communication network,
wherein the device configuration data includes one or more network types and respective device settings associated with respective ones of the one or more network types; and
in response to requesting to connect to the mobile communication network and determining the one or more particular device settings, configure one or more device settings of the wireless device to comply with the one or more particular device settings,
wherein configuring the one or more device settings of the wireless device to comply with the one or more particular device settings comprises disabling the wireless device from requesting for the mobile communication network to provide data services.

8. The wireless device of claim 7, wherein the instructions further cause the wireless device to receive, from the mobile communication network, a system information block, wherein the particular network information is included within the system information block.

9. The wireless device of claim 7, wherein configuring the one or more device settings in accordance with the one or more particular device settings comprises disabling the wireless device from requesting for the mobile communication network to provide voice call services.

10. The wireless device of claim 7, wherein configuring the one or more device settings in accordance with the one or more particular device settings comprises displaying, on a display of the wireless device, an indication that the wireless device is connected to a non-terrestrial network.

11. A method comprising:
receiving, by a wireless device and from a mobile communication network, particular network information allocated to the mobile communication network,
wherein the particular network information comprises a public land mobile network PLMN) code broadcast by the mobile communication network;
in response to receiving the particular network information, requesting, by the wireless device, to connect to the mobile communication network such that a wireless communication service is provided by the mobile communication network;
in response to receiving the particular network information, determining, based on the particular network information, that the mobile communication network is a non-terrestrial network;
in response to determining that the mobile communication network is a non-terrestrial network, determining, based on device configuration data, one or more particular device settings with which the wireless device is to comply when connected with the mobile communication network,
wherein the device configuration data includes one or more network types and respective device settings associated with respective ones of the one or more network types; and
in response to requesting to connect to the mobile communication network and determining the one or more particular device settings, configuring one or more device settings of the wireless device to comply with the one or more particular device settings,
wherein configuring the one or more device settings of the wireless device to comply with the one or more particular device settings comprises disabling the wireless device from requesting for the mobile communication network to provide voice call services.

12. The method of claim 11, wherein configuring the one or more device settings in accordance with the one or more particular device settings comprises disabling the wireless device from requesting for the mobile communication network to provide data services.

13. The method of claim 11, wherein configuring the one or more device settings in accordance with the one or more particular device settings comprises displaying, on a display of the wireless device, an indication that the wireless device is connected to a non-terrestrial network.

14. The method of claim 11, further comprising receiving, from the mobile communication network, the device configuration data.

\* \* \* \* \*